(12) United States Patent
Balconi et al.

(10) Patent No.: US 7,060,209 B2
(45) Date of Patent: Jun. 13, 2006

(54) EXTRUSION METHOD AND APPARATUS FOR PRODUCING A CABLE

(75) Inventors: Luca Balconi, Bresso (IT); Alberto Bareggi, Milan (IT); Sergio Belli, Leghorn (IT); Paolo Veggetti, Monza (IT)

(73) Assignee: Pirelli & C. S.p.A., Milan (IT)

( * ) Notice: Subject to any disclaimer, the term of this patent is extended or adjusted under 35 U.S.C. 154(b) by 0 days.

(21) Appl. No.: 10/488,950

(22) PCT Filed: Sep. 3, 2002

(86) PCT No.: PCT/EP02/09815

§ 371 (c)(1),
(2), (4) Date: Oct. 27, 2004

(87) PCT Pub. No.: WO03/023791

PCT Pub. Date: Mar. 20, 2003

(65) Prior Publication Data

US 2005/0046073 A1    Mar. 3, 2005

Related U.S. Application Data

(60) Provisional application No. 60/323,096, filed on Sep. 19, 2001.

(30) Foreign Application Priority Data

Sep. 10, 2001   (EP) .................................. 01203402

(51) Int. Cl.
*B29C 44/32*   (2006.01)
*B29C 47/02*   (2006.01)
*B32B 5/18*    (2006.01)

(52) U.S. Cl. ..................... 264/45.9; 264/101; 264/102; 264/171.13; 264/171.14; 264/171.17; 264/171.18

(58) Field of Classification Search ............... 264/102, 264/171.17, 171.13, 171.14, 171.18, 45.9, 264/101
See application file for complete search history.

(56) References Cited

U.S. PATENT DOCUMENTS

| | | | | |
|---|---|---|---|---|
| 4,146,562 A | * | 3/1979 | Fukushima et al. | .... 264/45.9 X |
| 4,252,755 A | * | 2/1981 | Normanton et al. | ....... 264/45.9 |
| 4,468,435 A | * | 8/1984 | Shimba et al. | .............. 428/383 |
| 4,744,930 A | * | 5/1988 | Twist et al. | ................. 264/411 |
| 4,916,198 A | | 4/1990 | Scheve et al. | |

FOREIGN PATENT DOCUMENTS

| | | |
|---|---|---|
| DE | 43 34 232 A1 | 4/1995 |
| EP | 0 507 988 A1 | 10/1992 |
| WO | WO 98/52197 A1 | 11/1998 |

* cited by examiner

*Primary Examiner*—Leo B. Tentoni
(74) *Attorney, Agent, or Firm*—Finnegan, Henderson, Farabow, Garrett & Dunner, L.L.P.

(57) ABSTRACT

An extrusion method and apparatus for producing a cable including at least one core having at least one transmissive element and at least one pair of coating layers arranged at a radially outer position with respect to the core. At least one coating layer of polymeric material and one coating layer of expanded polymeric material are deposited by co-extrusion simultaneously and residual pressure not greater than the external pressure is maintained in a substantially annular interspace defined between the coating layers. The method avoids the formation of bubbles at the interface between the at least one coating layer of polymeric material and the coating layer of expanded polymeric material, attaining an optimal adhesion between the layers.

11 Claims, 4 Drawing Sheets

EXTRUSION METHOD AND APPARATUS FOR PRODUCING A CABLE

CROSS REFERENCE TO RELATED APPLICATIONS

This application is a national phase application based on PCT/EP02/09815, filed Sep. 3, 2002, the content of which is incorporated herein by reference, and claims the priority of European Patent Application No. 01203402.1, filed Sep. 10, 2001, and claims the benefit of U.S. Provisional Application No. 60/323,096, filed Sep. 19, 2001.

FIELD OF THE INVENTION

The present invention concerns a method for producing a cable including at least one core comprising at least one transmissive element, and at least one pair of coating layers arranged at a radially outer position with respect of the core, at least one coating layer of said at least one pair being made of expanded polymeric material.

The present invention also regards an extrusion apparatus for producing such a cable.

In the present description and in the subsequent claims, the term "core" of a cable is used to indicate a semi-finished structure comprising a transmissive element, such as an electrical energy transmissive element, an optical signal transmissive element or an element which transmits both electrical energy and optical signals, and at least one electrical isolation or, respectively, at least one containment element (such as for example a tube, a sheath, a microsheath or a grooved core), or at least two elements, one of which is an electrical isolation element and one is a containment element, arranged at a radially outer position with respect of the corresponding transmissive element.

In the present description and in the subsequent claims, the term "electrical energy transmissive element" is used to indicate any element capable of transmitting electrical energy, such as a metallic conductor element. As an illustrative example, if we consider a cable for transporting or distributing medium/high voltage electrical energy (where medium voltage indicates a voltage comprised between about 1 kV and about 30 kV, whereas high voltage indicates a voltage greater than about 30 kV), the "core" of the cable further comprises an inner semi-conductive coating arranged at a radially outer position with respect of the conductor element, an outer semi-conductive coating arranged at a radially outer position with respect of the electrical isolation element and a metallic screen arranged at a radially outer position with respect of said outer semi-conductive coating.

In the present description and in the subsequent claims, the term "optical signal transmissive element" is used to indicate any transmission element comprising at least one optical fibre. Therefore, such a term identifies both a single optical fibre and a plurality of optical fibres, optionally grouped together to form a bundle of optical fibres or arranged parallel to each other and coated with a common coating to form a ribbon of optical fibres.

In the present description and in the subsequent claims, the term "mixed electro-optical transmissive element" is used to indicate any element capable of transmitting both electrical energy and optical signals in accordance with the abovementioned definitions.

The present invention also refers to cables provided with a plurality of cores as defined above, known in the field with the terms "bipolar cable", "tripolar cable" and "multipolar cable" depending on the number of cores incorporated therein (in the mentioned cases in number of two, three or greater, respectively).

In accordance with such definitions, the present invention refers to cables provided with one or more cores of any type. In other words, the present invention refers to unipolar or multipolar cables, of the electric type for transporting or distributing electrical energy, or of the optical type comprising at least one optical fibre or of the mixed energy/telecommunications type.

PRIOR ART

Cables essentially consisting of a core comprising a transmissive element and of at least one pair of coating layers at least one of which is made of expanded polymeric material are known, as described, for example, in the International patent application WO 98/52197, in the name of the Applicant, the specification of which is herein incorporated by reference. The layer of expanded polymeric material confers to the cable a high impact resistance while ensuring an advantageous lightness of the cable itself.

In the present description and in the subsequent claims, the term "expanded polymeric material" is used to indicate a polymeric material having a predetermined percentage of "free" space within the material, i.e. a space not occupied by the polymeric material, but by gas or air.

In general, such a percentage of free space in an expanded polymer is expressed by the so-called "expansion degree" (G), defined as follows:

$$G=(d_0/d_e-1)\times 100$$

where $d_0$ indicates the density of the unexpanded polymer and $d_e$ indicates the apparent density measured on the expanded polymer (i.e. the final density of the expanded polymer).

Similarly, in the present description and in the subsequent claims, the term "expandable polymeric material" is used to indicate a suitable polymeric material which, when expanded, changes into an expanded polymeric material as defined above.

As regards the ways by which a polymeric material of such type expands, the expansion thereof may be attained both chemically and physically, as reported by the abovementioned patent application WO 98/52197.

FIG. 1 schematically illustrates a cable 1 of the known type for transporting or distributing medium/high voltage electrical energy which is capable of ensuring a high impact resistance. Starting from the radially innermost position towards the radially outermost layers, the cable 1 comprises: a core 7 at a radially outer position of which a coating layer 8 of polymeric material is arranged; a coating layer 9 of expanded polymeric material arranged at a radially outer position with respect of said layer 8 and a polymeric sheath 10 arranged radially outside of said layer 9. The core 7, in its turn, includes a conductor element 2 of the electric type, i.e. an electrically transmissive element as defined above, a first semi-conductive coating 3 at a radially outer position with respect of said conductor element 2, an isolating coating 4 at a radially outer position with respect of said first semi-conductive coating 3 and a second semi-conductive coating 5 at a radially outer position with respect of said isolating coating 4. Finally, at a radially outer position with respect of said second semi-conductive coating 5, the cable 1 represented in FIG. 1 comprises a metallic screen 6.

In order to accomplish a perfect adhesion between the coating layer 8 of polymeric material and the coating layer 9 of expanded polymeric material, the prior art provides the use of two distinct and successive extrusion steps, each one of which is carried out by using a dedicated extrusion apparatus. Said distinct extrusion steps may be carried out on two distinct lines, separated from each other by a step of collecting on a reel the cable being produced, or may be carried out in series on the same line ("tandem" technique).

Moreover, the above-mentioned prior art provides that, downstream of each extrusion step, an intermediate cooling step is arranged, usually carried out through the use of a suitable cooling channel within which a cooling fluid, typically water, flows at a temperature generally comprised between 10° C. and 25° C., said temperature depending both on the length of the cooling channel and on the linear velocity of the extrusion line.

Such production methods known in the art are expensive due both to the cost of the apparatus necessary to carry them out, in particular of the extrusion apparatus, and to the time required to carry out the above-mentioned single extrusion and cooling steps downstream of each single extrusion step.

Moreover, the above-mentioned "tandem" technique may cause some problems concerning the management and the control of two or more extruders in series since the cable being formed leaving a given extruder must be perfectly guided, after cooling thereof, within the subsequent extruder. This means, therefore, that it is necessary to carry out a rigorous control of the velocity of the line and of the size of the cable being formed in order to avoid stops of the line. Therefore, it can be easily understood that such a solution is complex to manage and may cause problems in terms of reliability of the process and also in terms of the quality of the product thus obtained.

Moreover, said methods are particularly difficult to be carried out with reference to the labour involved in the control and inspection operations both of the extrusion steps and apparata. Furthermore, the presence of a plurality of extrusion and cooling apparata requires the availability of a large space capable of housing the whole production unit.

SUMMARY OF THE INVENTION

In order to overcome the drawbacks of the prior art described above, the Applicant has perceived the need to prepare a method for producing a cable including at least one coating layer made of expanded polymeric material, such a method being easier to carry out and less burdensome (in terms of costs and production time, as well as of the size of the line) with respect to the methods of the prior art.

In particular, the Applicant has perceived that the above-mentioned method for producing a cable may advantageously include a step of deposition by co-extrusion capable of simultaneously depositing, around the cable core, at least one coating layer made of polymeric material and a coating layer made of expanded polymeric material.

However, on the basis of the experiments carried out, the Applicant has noted that said step of deposition by co-extrusion had the drawback that, during the expansion of the expandable polymeric material used to obtain said coating layer of expanded polymeric material, gases were generated, which gases, having no release outlet, remained trapped within the material, said aspect resulting in the formation of bubbles at the interface between the coating layer of expanded polymeric material and the coating layer of polymeric material deposited in a position of reciprocal contact with said coating layer of expanded polymeric material.

Such a phenomenon was absolutely unacceptable since the presence of said bubbles was in itself a cause of non-conformity of the product and, besides, said bubbles constituted a possible cause of detachment between the above-mentioned layers within the finished product.

The Applicant has found that it is possible to deposit by co-extrusion around the core of the cable at least one coating layer of polymeric material and one coating layer of expanded polymeric material without causing the above-mentioned drawback ensuring that the residual pressure in the interspace formed between said layers leaving the extruder head is not greater than the pressure external to the cable being formed during the co-extrusion of said layers.

In other words, the Applicant has found that a solution for removing the gases formed during the expansion step of the expandable polymeric material, which is effective and thus capable of avoiding problems of adhesion at the interface between the coating layer of polymeric material and the coating layer of expanded polymeric material, consists in creating within said interspace a degree of vacuum sufficient to ensure the suction of said gases and to prevent the undesired formation of bubbles. This means, therefore, to ensure that the residual pressure within said interspace is lower than the pressure external to said interspace. Such a suction may advantageously be carried out by providing a suction device, for example a vacuum pump, in fluid communication with said interspace.

In accordance with a first aspect thereof, the present invention refers, therefore, to a method for producing a cable including:
　at least one core comprising at least one transmissive element, and
　at least one pair of coating layers arranged at a radially outer position with respect of said core, said method comprising the steps of:
a) depositing by co-extrusion around said core:
　1) at least one coating layer of polymeric material;
　2) one coating layer of expanded polymeric material in contact with said at least one coating layer of polymeric material;
b) maintaining a residual pressure not greater than the external pressure in a substantially annular interspace, defined during said deposition step between said at least one coating layer of polymeric material and said one coating layer of expanded polymeric material, wherein said steps a) and b) are carried out simultaneously.

Advantageously, the method of the invention allows to obtain an Optimal adhesion between the coating layer of expanded polymeric material and the coating layer of polymeric material. Indeed, thanks to the fact that, simultaneously to the above-mentioned step of deposition by co-extrusion, the further step of maintaining the above-mentioned interspace at a residual pressure lower than the external pressure is carried out, the gases or the vapours produced during the expansion of the expandable material are continuously removed. This advantageously allows to prevent the formation of bubbles at the interface between the above-mentioned coating layers, therefore resulting in an optimal adhesion therebetween.

Moreover, the method according to the invention allows a reduction of the times and of the costs of the plant for producing the cable with respect to the times and the costs required by the methods of the prior art. Indeed, thanks to the fact that at least one coating layer of polymeric material and a coating layer made of expanded polymeric material are deposited by co-extrusion around the core in a single step, the method of the invention advantageously allows to carry out a process for producing cables thus coated in a simplified manner and using a production line with a considerably reduced size.

Preferably, the expandable material of the coating layer of expanded polymeric material expands during the above-mentioned step a) of deposition by co-extrusion, which therefore allows to form the two coating layers through a "one-shot" technique.

Preferably, the above-mentioned coating layer of expanded polymeric material is deposited at a radially outer position with respect of said at least one coating layer of polymeric material.

Advantageously, in such a way the expansion of the expandable polymeric material used to form the above-mentioned coating layer of expanded polymeric material is facilitated.

Preferably, the residual pressure in the interspace is comprised between about 5 kPa and about 90 kPa and, even more preferably, is comprised between about 10 kPa and about 50 kPa.

By respecting such preferred residual pressure ranges, an optimal removal of the gases produced during expansion is advantageously ensured.

Indeed, in general, with a residual pressure in the interspace greater than about 90 kPa, the removal of the expansion gases is not very effective and may not be sufficient to prevent the formation of bubbles at the interface between the coating layer made of polymeric material and the coating layer made of expanded polymeric material.

Moreover, in general, with a residual pressure in the interspace smaller than about 5 kPa, in view of a substantial increase in the management costs, a substantial improvement of the removal of the expansion gases is not obtained. The Applicant has indeed observed that, in view of a considerable increase in costs, both of the plant and of the energy, the achievement of a very strong vacuum degree—almost reaching the absolute vacuum—does not imply any substantial improvement in the removal of the expansion gases.

In the case in which the method of the invention comprises the step of depositing by co-extrusion a coating layer of expanded polymeric material at a radially outer position with respect of a coating layer made of polymeric material and in accordance with a further preferred embodiment, the method comprises the further step of depositing by extrusion about said coating layer of expanded polymeric material a polymeric sheath of predetermined thickness to further protect the cable from the external environment. Preferably, said sheath has a thickness comprised between about 0.5 mm and about 5 mm. More preferably, said thickness is comprised between about 1 mm and about 4 mm.

For the purposes of the invention, the expandable material is preferably selected from the group comprising: polyethylene (PE), low density PE (LDPE), medium density PE (MDPE); high density PE (HDPE), linear low density PE (LLDPE); polypropylene (PP); ethylene-propylene rubber (EPR), ethylene-propylene copolymer (EPM), ethylene-propylene-diene terpolymer (EPDM); natural rubber; butyl rubber; ethylene/vinyl acetate copolymer (EVA); polystyrene; ethylene/acrylate copolymer, ethylene/methyl acrylate (EMA), ethylene/ethyl acrylate (EEA), ethylene/butyl acrylate (EBA); ethylene/α-olefin copolymer; acrylonitrile-butadiene-styrene resin (ABS); halogenated polymer, polyvinylchloride (PVC), polyurethane (PU); polyamide; aromatic polyester, polyethylene terephthalate (PET), polybutylene terephthalate (PBT); or a mixture thereof.

The expansion degree G of the expanded material, as defined above, is preferably comprised between about 10% and about 200% and, even more preferably, between about 50% and about 150%.

In the present description and in the subsequent claims, with reference to a conventional extrusion head comprising at least one plurality of dies between which at least one respective channel for feeding at least one respective coating material to be deposited by extrusion is defined, the expression of "Draw Down Ratio" (DDR) is used to indicate the ratio between the cross-sectional area defined between two adjacent dies and defining the section for the passage of the coating material, said area being calculated at the outlet section of the extrusion head, and the cross-sectional area of the effectively deposited coating layer.

Preferably, the step of deposition by co-extrusion of the coating layer of expanded polymeric material is carried out according to a DDR preferably comprised between about 0.3 and about 3 and, more preferably, between about 0.4 and about 0.7.

More precisely, in the case in which a coating layer of compact (i.e. not expanded) polymeric material is deposited by extrusion on a generic cable being formed, in general the above-mentioned DDR is greater than 1 since, as said material leaves the extrusion head, the same undergoes a stretching and the cross-section of the material effectively deposited on the cable being formed is smaller than the outlet cross-section of the die suitable for depositing said layer. On the contrary, in the present case, since the layer being deposited is constituted by an expandable polymeric material, in general said DDR is greater than 1 (and, therefore, an effective stretching of the material is carried out) in the portion of the line immediately downstream of the outlet section of the die and becomes smaller than 1 as soon as the expansion of said expandable polymeric material starts since, due to the effect of the expansion, the cross-section of the material deposited on the cable being formed becomes greater with respect to the outlet section of the die suitable for depositing said layer.

Advantageously, maintaining the DDR between said preferred ranges allows to reduce the tendency to form bubbles at the interface between said coating layers being deposited.

In a second aspect thereof, the present invention refers to an extrusion apparatus for producing a cable including:
  a core comprising at least one transmissive element, and
  at least one pair of coating layers arranged at a radially outer position with respect of said core, said apparatus comprising an extrusion head including:
  a) a male die, at least one intermediate die and one female die coaxially mounted between each other around a longitudinal axis substantially parallel to an advancing direction of said core;
  b) a longitudinal cavity intended for receiving said core defined in said male die;
  c) at least one pair of feeding channels defined in said extrusion head and intended for depositing by co-extrusion, respectively, at least one coating layer of polymeric material and one coating layer of expanded polymeric material, respectively,
  d) at least one suction channel intended for sucking the gases released during the expansion of said one coating layer of expanded polymeric material; and
  e) a device for the formation of vacuum in fluid communication with said at least one suction channel.

Advantageously, said extrusion apparatus allows to deposit by co-extrusion around the core of the cable at least one pair of coating layers, one of which of expanded polymeric material, without any substantial and undesired formation of bubbles at the interface between the above-mentioned layers. As mentioned above, in such a way it is advantageously possible to use the same extrusion apparatus and a single cooling step with a consequent saving in costs and times of production of the cable.

Preferably, said first feeding channel, suitable for extruding a coating layer of polymeric material, is arranged at a radially inner position with respect of said second feeding channel, suitable for extruding a coating layer of expanded polymeric material.

In accordance with a preferred embodiment, said first feeding channel is provided with an opening arranged in proximity of the longitudinal cavity of the extrusion head so as to deposit the coating layer of polymeric material in reciprocal contact with the cable core.

Preferably, moreover, the second feeding channel is provided with a respective opening arranged in proximity of the opening of the first feeding channel so as to deposit the coating layer of expanded polymeric material in reciprocal contact with the coating layer of polymeric material.

Preferably, said at least one suction channel is interposed between said first and second feeding channels.

Preferably, said first feeding channel is defined, at least partly, between the male die and the intermediate die of the extrusion head.

Preferably, said second feeding channel is defined, at least partly, between the intermediate die and the female die of the extrusion head.

In a further preferred embodiment, the extrusion apparatus of the invention comprises a plurality of suction channels arranged longitudinally in the extrusion head along a direction substantially parallel to the advancing direction of the cable being formed and radially distributed with respect to said advancing direction.

In a preferred embodiment, the suction channel or channels are axially formed in the intermediate die so as to extend within the extrusion head between the feeding channels suitable for extruding the polymeric coating layers of the cable.

According to an alternative embodiment, the extrusion head comprises, starting from the radially innermost position towards the outermost position, a male die, a first intermediate die, an additional intermediate die and a female die. In such a case, the suction channel or channels are defined between the first intermediate die and the additional intermediate die.

BRIEF DESCRIPTION OF THE DRAWINGS

Additional features and advantages of the invention will become more readily apparent from the description of an embodiment of a method for producing a cable according to the invention, made hereafter with reference to the attached drawings in which, for illustrative and not limiting purposes, a cable comprising at least one transmissive element obtainable by the method of the invention and an extrusion apparatus for carrying out the same are shown.

In the drawings.

DETAILED DESCRIPTION OF THE PREFERRED EMBODIMENTS

Figure 2:
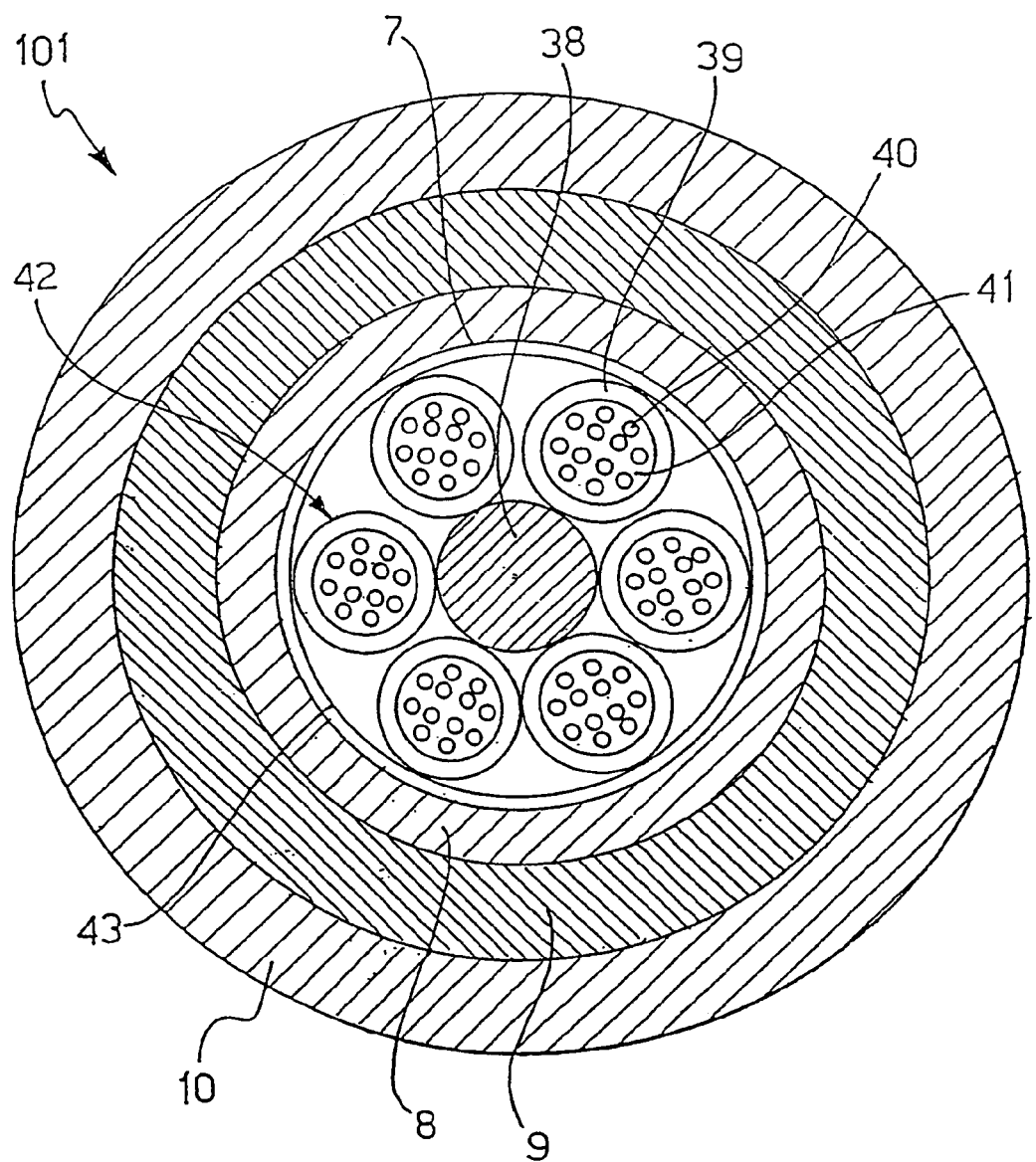
FIG. 2 is a cross-sectional view of an optical cable obtained in accordance with the method of the invention.

With reference to FIG. 2, an optical cable obtainable by the method and the apparatus of the present invention is generally indicated with reference sign 101.

In the following description, the elements of the cable structurally or functionally equivalent to those previously illustrated with reference to the cable 1 for transporting electrical energy shown in FIG. 1 shall be indicated with the same reference signs and shall not be further described. In accordance with the embodiment illustrated in FIG. 2, the optical cable 101 comprises, starting from the radially innermost position, a central reinforcement member 38 around which a plurality of tubes 39 is arranged, said tubes 39 being made of materials known in the art, within which at least one optical fibre 40, i.e. the optical signal transmissive element as defined above, is housed.

Preferably and as illustrated in FIG. 2, each tube 39 houses a plurality of optical fibres 40.

Within the tubes 39, the optical fibres 40 are immersed in a buffer filling 41 suitable for stopping the possible spreading of moisture following an accidental damage to the cable and, possibly, for absorbing the hydrogen which may be generated within the cable.

The optical cable 101 illustrated in FIG. 2 comprises a core 7 comprising, in its turn, a plurality of optical elements 42 (six in the example), each one of which comprises a tube 3) within which a plurality of optical fibres 40 is contained.

The optical elements 42 are distributed around said central reinforcement member 38 and are kept in position by a binding (not represented) followed by a containment ribbon 43, which is known per se and is not illustrated in detail.

The optical cable 101 further comprises, at a radially outer position with respect of the ribbon 43, a first coating layer 8 of polymeric material, a second coating layer 9 of expanded polymeric material and a sheath 10 of polymeric material. Said layers 8 and 9 are deposited by co-extrusion around the core 7 in accordance with the method of the invention.

Figure 1:
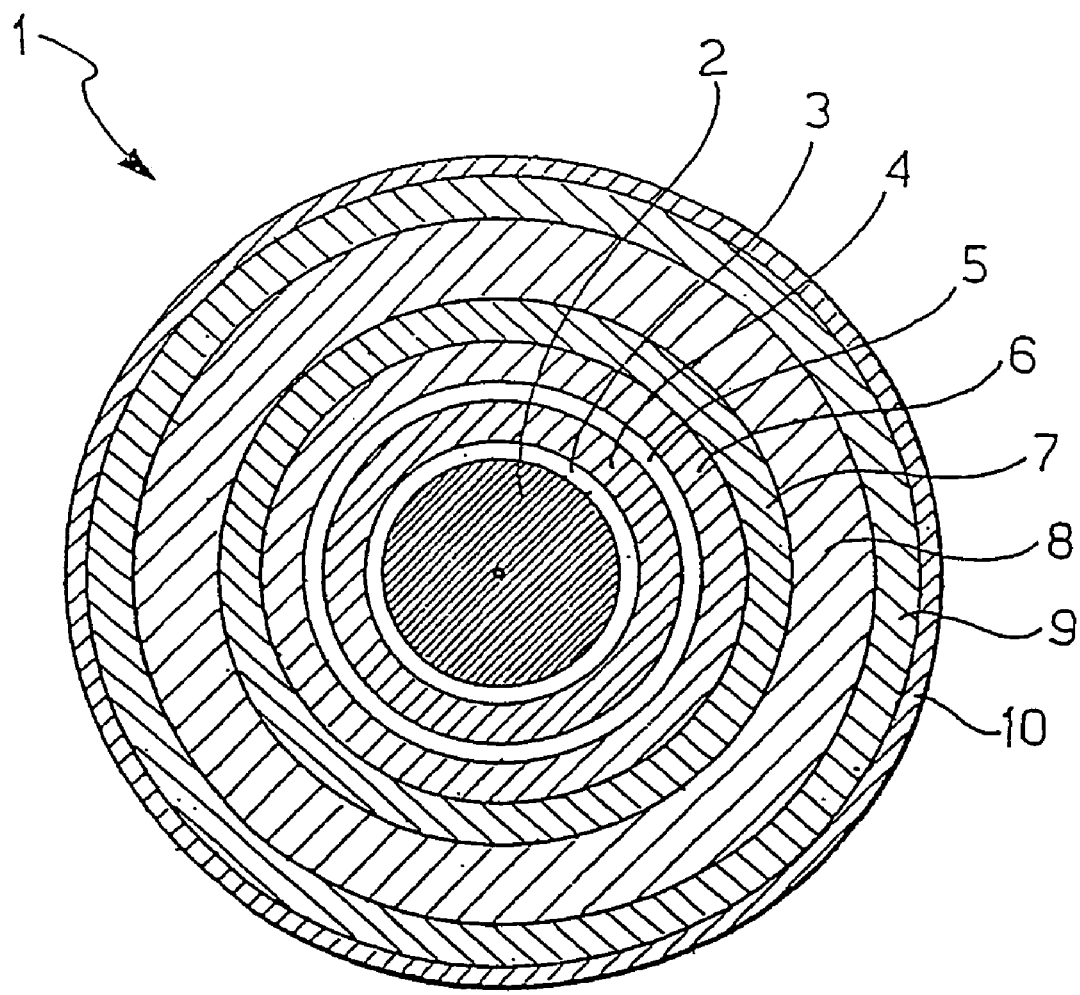
FIG. 1 is a cross-sectional view of an electric cable obtained in accordance with the method of the invention.

For illustrative purposes, with reference to both FIG. 1 and FIG. 2, in the electrical cable 1 and in the optical cable 101 illustrated therein, the first coating layer 8 is preferably made of medium density polyethylene (MDPE), whereas the second coating layer 9 of expanded polymeric material is preferably made of high melt strength polypropylene (PP), as described, for example, in U.S. Pat. No. 4,916,198, commercially available under the trade mark Profax® (Basell S.p.A.).

Figure 3:
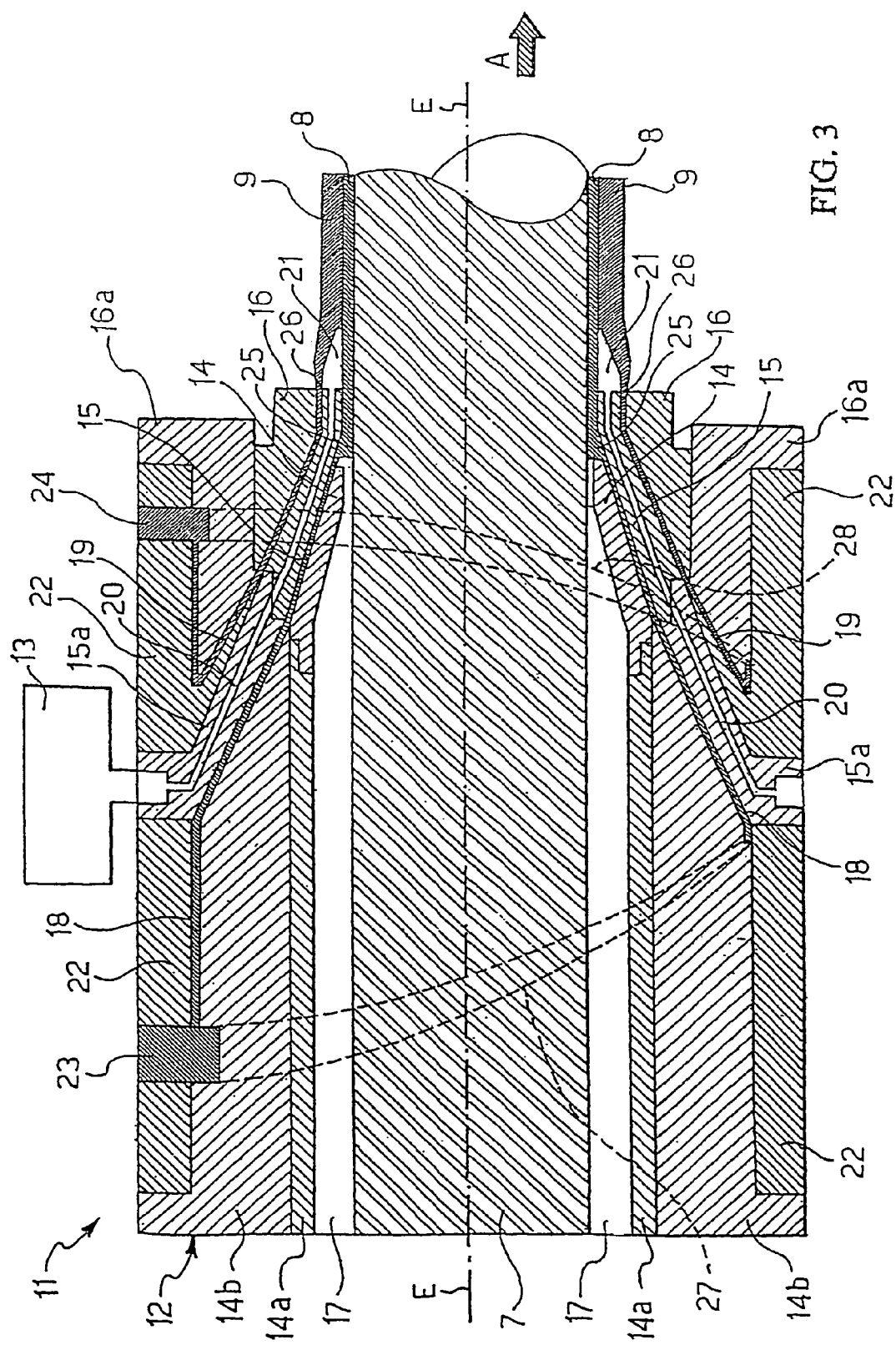
FIG. 3 is a view in longitudinal section of a preferred embodiment of the extrusion apparatus according to the invention.

FIG. 3 illustrates a preferred embodiment of an extrusion apparatus, generally indicated with reference sign 11, for producing a cable the core 7 of which is coated with a pair of coating layers: one coating layer 8 of polymeric material and one coating layer 9 of expanded polymeric material. In accordance with said illustrated embodiment, the coating layer 9 of expanded polymeric material is arranged at a radially outer position with respect of and in reciprocal contact with the coating layer 8 of polymeric material.

The extrusion apparatus 11 of the invention is advantageously capable of producing an electrical cable 1 (for example of the type illustrated in FIG. 1), an optical cable 101 (for example of the type illustrated in FIG. 2) or a cable of a mixed electro-optical type (not shown).

In accordance with the invention, in the embodiment illustrated in FIG. 3, the extrusion apparatus 11 comprises an extrusion head 12 including a head body 22 upon which a male die 14, an intermediate die 15 and a female die 16 are respectively fitted.

The male die 14, the intermediate die 15 and the female die 16 are coaxially mounted between each other around the same longitudinal axis E—E which is substantially parallel to the advancing direction (indicated by the arrow A) of the core 7 of the cable being produced.

More specifically, in accordance with the preferred embodiment illustrated in FIG. 3, the male die 14 is kept in the correct working position within the head body 22 by the supporting element 14a axially associated to the male die 14. Such a supporting element 14a is arranged coaxially with and at a radially outer position with respect of a longitudinal cavity 17 defined within the male die 14 and intended to receive the core 7 of the electrical, optical or mixed electro-optical cable being formed. At a radially outer position with respect of the supporting element 14a a first conveyor element 14b, the function of which shall be explained in the following of the present description, is arranged.

In the embodiment illustrated in FIG. 3, the extrusion head 12 comprises a second conveyor element 15a axially associated to the intermediate die 15 and arranged coaxially with and at a radially outer position with respect of the first conveyor element 14b. The function of said second conveyor element 15a shall be also explained in the following of the present description.

In the embodiment illustrated in FIG. 3, the extrusion head 12 further comprises a third conveyor element 16a operatively associated to the female die 16 and arranged coaxially with and at a radially outer position with respect of the female die 16. The third conveyor element 16a is directly fitted onto the head body 22 which is arranged at a radially outer position with respect of the third conveyor element 16a.

For merely illustrative purposes, in order to coat a core 7 having an outer diameter equal to about 23 mm with a coating layer 8 of a polymeric material having a thickness equal to about 1.5 mm and with a coating layer 9 of an expanded polymeric material having a thickness equal to about 2.8 mm, it is necessary to provide a male die 14 having an inner diameter preferably equal to about 24.1 mm, an intermediate die 15 having an inner diameter preferably equal to about 26.1 mm and an outer diameter preferably equal to about 30 mm, and a female die 16 having an inner diameter preferably equal to about 32.6 mm. The outer diameter of the cable provided with the pair of coating layers 8 and 9 is in such a case equal to about 32 mm, whereas the draw down ratio DDR of the coating layer 9 of expanded polymeric material is equal to about 0.45.

The thickness of the coating layer 9 of expanded polymeric material is also a function of the expansion degree G of the expanded material which, in its turn, strongly depends upon the extrusion temperature: usually, an increase in the extrusion temperature corresponds to a higher expansion degree G.

The extrusion head 12 further includes a first radially inner feeding channel 18 suitable for extruding onto the core 7 the coating layer 8 of polymeric material and a radially outer second feeding channel 19 suitable for extruding the coating layer 9 of expanded polymeric material at a radially outer position with respect of and in reciprocal contact with said first coating layer 8 of polymeric material.

In accordance with the embodiment illustrated in FIG. 3, in the radially inner feeding channel 18 a passageway for the material being extruded is defined, which passageway is substantially annular and continuous, coaxial with the longitudinal cavity 17. Similarly, the radially outer feeding channel 19 defines, at least partly, a passageway for the material being extruded is defined, which passageway is substantially annular and continuous, coaxial with the longitudinal cavity 17.

In accordance with the embodiment illustrated in FIG. 3, the radially inner wall of the feeding channel 18 is defined between the male die 14 and the first conveyor element 14b, whereas the radially outer wall of said feeding channel 18 is defined between the intermediate die 15, the second conveyor element 15a and the head body 22.

In accordance with the embodiment illustrated in FIG. 3, the feeding channel 19 is defined between the intermediate die 15, the female die 16, the head body 22 and said third conveyor element 16a The radially inner feeding channel 18 and the radially outer feeding channel 19 extend between respective inlet openings 23, 24 and respective outlet openings 25, 26.

More precisely, the inlet opening 23 is formed in the head body 22 and in said first conveyor element 14b, whereas the inlet opening 24 is formed in the head body 22 and in said third conveyor element 16a.

In a way known per se, for example through suitable pipes, not illustrated, the inlet openings 23, 24 (and, therefore, the radially inner feeding channel 18 and the radially outer feeding channel 19, respectively) are in communication with suitable chambers intended to house respective extrusion screws, not illustrated since they are conventional per se.

The polymeric material entering the extrusion head 12 through the inlet opening 23 has to be distributed as much homogeneously as possible on the radially outer surface of the core 7 of the cable moved within the longitudinal cavity 17. This is ensured by the presence of said first conveyor element 14b, which is advantageously provided with a pair of distribution channels 27 (only one of which is illustrated in broken line in FIG. 3) in fluid communication with the inlet opening 23. The distribution channels 27 have a configuration of curvilinear type (preferably of helical type) and respectively extend on sides radially opposite with respect to the axis E—E. Therefore, said first conveyor element 14b provided with the distribution channels 27 carries out the function of uniformly distributing in the radially inner feeding channel 18 the polymeric material intended to form the coating layer 8 of polymeric material.

Similarly, the expandable polymeric material entering the extrusion head 12 through the inlet opening 24 has to be distributed as much homogeneously as possible on the radially outer surface of the coating layer 8 of polymeric material extruded onto the core 7 of the cable as described above. Said distribution homogeneity of the expandable polymeric material is obtained through said third conveyor element 16a advantageously provided with a pair of distribution channels 28 (only one of which is illustrated in broken line in FIG. 3) in fluid communication with the inlet opening 24. The distribution channels 28 have a configuration of curvilinear type (preferably of helical type) and respectively extend on sides radially opposite with respect to the axis E—E. Therefore, said third conveyor element 16b provided with the distribution channels 28 carries out the function of uniformly distributing in the radially outer feeding channel 19 the expandable polymeric material intended to constitute the coating layer 9 of expanded polymeric material.

According to the preferred embodiment illustrated in FIG. 3, the distribution channels 28 are oppositely inclined with respect to the distribution channels 27 with reference to a plane perpendicular to the axis E—E.

According to the preferred embodiment illustrated in FIG. 3, moreover, the radially outer feeding channel 19 has an elbow-shaped configuration suitable for reducing the size of the extrusion head 12 of the apparatus 11 in the longitudinal direction.

In such a way, when the extrusion apparatus 11 is working, in proximity of the outlet openings 25, 26 of the extrusion head 12 a substantially annular interspace 21 is formed between the coating layer 8 of polymeric material and the coating layer 9 of expanded polymeric material being deposited.

Finally, the extrusion head 12 further comprises a plurality of suction channels 20 defined between the radially inner 18 and radially outer 19 feeding channels, said channels being in fluid communication with a device 13 (indicated schematically in FIG. 3) for forming the vacuum. The device 13 may be, for example, a vacuum pump which is known per se and therefore not described in detail or any other means or device suitable for maintaining in the interspace 21 a residual pressure not greater than the pressure existing externally to the cable being formed.

Figure 4:
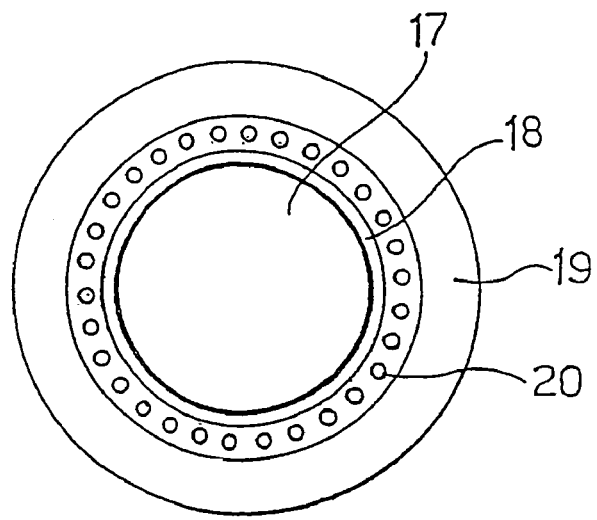
FIG. 4 is a front view of the extrusion head of FIG. 3.
Figure 5:
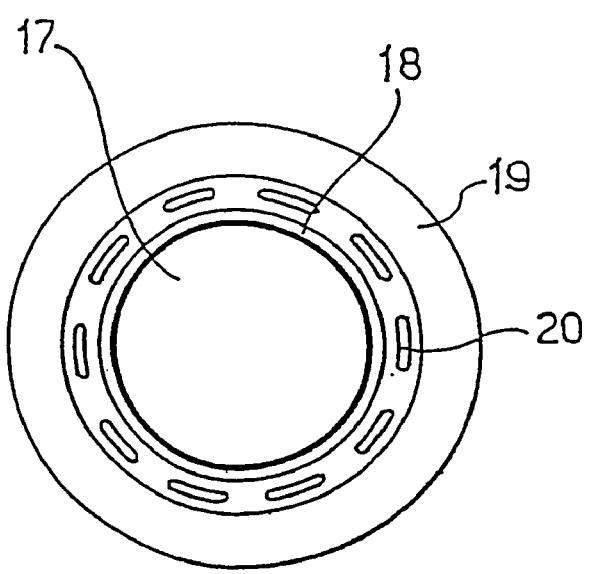
FIG. 5 is a front view of a further embodiment of the extrusion head according to the invention.

In this embodiment and as illustrated in FIGS. 4 and 5, the suction channels 20 extend substantially longitudinally in the extrusion head 12 along a direction substantially parallel to the axis E—E and are radially distributed with respect to said axis.

Advantageously, the suction channels 20 allow to remove from the extrusion head 12 the gases or vapours developing during the expansion of the expandable polymeric material as they form.

Preferably, in accordance with what is illustrated in FIG. 3, the suction channels 20 are axially formed within the intermediate die 15 and the second conveyor element 15a.

According to a further embodiment, not illustrated, the suction channels 20 may be defined between two distinct intermediate dies.

Preferably, the suction channels 20 are equally spaced with respect to the axis E—E. Preferably, the geometric centres of the cross-sections of the suction channels 20 lie on the same circumference coaxial with the axis E—E.

The suction channels 20 may have any cross-sectional profile. Preferably they have a substantially circular section (as illustrated in FIG. 4) or a substantially rectangular section (as illustrated in FIG. 5).

In an alternative preferred embodiment, not shown, a single suction channel is provided in a way substantially similar to what has been illustrated with reference to the feeding channels 18, 19.

With reference to the preferred embodiment of the apparatus described above and illustrated in FIG. 3, the method according to the invention for producing a cable including at least one core 7 (such as, for example, the electric cable 1 or the optical cable 101 or a cable of the mixed electro-optical type), in a preferred embodiment thereof, comprises the following steps.

In a first step and after having conveyed the core 7, obtained in a way known per se, within the longitudinal cavity 17 of the extrusion head 12, the coating layer 8 of polymeric material and, at a radially outer position with respect of said layer, the coating layer 9 of expanded polymeric material are simultaneously deposited by co-extrusion around the core 7.

More precisely, the coating layer 8 of polymeric material is deposited by co-extrusion by means of the first radially inner feeding channel 18, whereas the coating layer 9 of expanded polymeric material is deposited by co-extrusion by means of the second radially outer feeding channel 19 of the extrusion head 12. To this purpose, simultaneously to the advancement of the core 7 (arrow A of FIG. 3), the polymeric composition used to form the coating layer 8 (for example MDPE) and the expandable polymeric composition (for example PP) used to form the coating layer 9 are separately fed through the respective inlet openings 23 and 24, respectively, to the radially inner feeding channel 18 and to the radially outer feeding channel 19, said compositions being driven by a pair of distinct extrusion screws which are known per se and not illustrated.

In such a way, on the core 7 leaving the extrusion head 12, the two coating layers 8 and 9 are obtained, said layers being in reciprocal contact.

In a second step, carried out simultaneously to the first step, the substantially annular interspace 21, temporarily defined between the coating layers 8 and 9 during the step of deposition by co-extrusion of said layers, is maintained at a residual pressure not greater than the external pressure, preferably comprised between about 10 kPa and about 50 kPa.

Said reduced pressure is maintained in the interspace 21 thanks to the device 13 and to the suction channels 20 defined in the extrusion head 12.

In such a way, the gases or vapours formed during the expansion of the expandable material constituting the coating layer 9 are continuously sucked thus avoiding, or at least reducing with respect to the methods of the prior art, the formation of bubbles or other discontinuities at the interface between the coating layers being deposited.

Preferably, and in order to protect from the external environment the cable which has been obtained, a further extrusion apparatus is provided, known per se and not illustrated in the figures, arranged downstream of the extrusion apparatus 11 (in the same line or in a distinct line), suitable for providing the cable with an outer polymeric sheath 10 having a thickness preferably between 1 mm and 5 mm.

As illustrated above, the present invention allows to achieve a plurality of advantages.

Firstly, the present invention provides a method for depositing by co-extrusion at least one pair of coating layers, one of which is made of expanded polymeric material, which method is capable of ensuring an optimal adhesion between said layers without the formation of bubbles or of detachments at the interface between said layers with respect to the methods of the prior art.

Moreover, the present invention allows to simplify the production processes of the prior art by advantageously reducing the number of apparatuses used (for example, the number of extruders and of cooling circuits). Said aspect results in a reduction of the size of the production line and, accordingly, in a significant reduction of costs and of hours/man required for the ordinary and extraordinary management of said line.

The invention claimed is:

1. A method for producing a cable including at least one core comprising at least one transmissive element and at least one pair of coating layers arranged at a radially outer position with respect of said core, comprising the steps of:

a) depositing by co-extrusion around said core
   1) at least one coating layer of polymeric material;
   2) one coating layer of expanded polymeric material in contact with said at least one coating layer of polymeric material; and
b) maintaining a residual pressure not greater than the external pressure in a substantially annular interspace defined during said deposition step between said at least one coating layer of polymeric material and said one coating layer of expanded polymeric material, wherein said steps a) and b) are carried out simultaneously.

2. The method according to claim 1, wherein said residual pressure is between about 5 kPa and about 90 kPa.

3. The method according to claim 2, wherein said residual pressure is between about 10 kPa and about 50 kPa.

4. The method according to claim 1, wherein said coating layer of expanded polymeric material is deposited by co-extrusion at a radially outer position with respect to said at least one coating layer of polymeric material.

5. The method according to claim 1 or 4, further comprising the step of depositing by extrusion around said at least one pair of coating layers an outer polymeric sheath of predetermined thickness.

6. The method according to claim 1, wherein the expandable material of said coating layer of expanded polymeric material expands during step a) of deposition by coextrusion.

7. The method according to claim 6, wherein said expandable material is selected from the group of polyethylene (PE), low density PE (LDPE), medium density PE (MDPE); high density PE (HDPE), linear low density PE (LLDPE); polypropylene (PP); ethylene-propylene rubber (EPR), ethylene-propylene copolymer (EPM), ethylene-propylene-diene terpolymer (EPDM); natural rubber; butyl rubber; ethylene-vinyl acetate copolymer (EVA); polystyrene; ethylene/acrylate copolymer, ethylene/methyl acrylate (EMA), ethylene/ethyl acrylate (EEA), ethylene/butyl acrylate (EBA); ethylene/α-olefin copolymer; acrylonitrile-butadiene-styrene resin (ABS); halogenerated polymer, polyvinylchloride (PVC), polyurethane (PU); polyamide; aromatic polyester, polyethylene terephthalate (PET), polybutylene terephthalate (PBT); and derivatives and mixtures thereof.

8. The method according to claim 1, wherein said step of depositing by co-extrusion a coating layer of expanded polymeric material is carried out according to a draw down ratio (DDR) between about 0.3 and about 3.

9. The method according to claim 8, wherein said draw down ratio (DDR) is between about 0.4 and about 0.7.

10. The method according to claim 1, wherein said expanded polymeric material has an expansion degree between about 10% and about 200%.

11. The method according to claim 10, wherein said expansion degree is between about 50% and about 150%.

* * * * *